Dec. 30, 1969 R. E. SMITH ET AL 3,487,219
LIQUID SCINTILLATION COUNTER HAVING MEANS FOR REMOVING
ELECTROSTATIC CHARGES ON SAMPLES
Filed April 11, 1966 2 Sheets-Sheet 1

INVENTORS.
ROY E. SMITH
ROBERT C. GULLETT
BY
Wolfe, Hubbard, Voit & O'sann
ATTORNEYS.

United States Patent Office 3,487,219
Patented Dec. 30, 1969

3,487,219
LIQUID SCINTILLATION COUNTER HAVING MEANS FOR REMOVING ELECTROSTATIC CHARGES ON SAMPLES
Roy E. Smith, Villa Park, and Robert C. Gullett, Hampton Park, Lockport, Ill., assignors, by mesne assignments, to Packard Instrument Company, Inc., Downers Grove, Ill., a corporation of Delaware
Filed Apr. 11, 1966, Ser. No. 541,694
Int. Cl. G21h 5/00
U.S. Cl. 250—106          10 Claims

ABSTRACT OF THE DISCLOSURE

A liquid scintillation counting apparatus is provided with means for removing electrostatic charges on sample containers. To remove such charges, the containers are contacted with a volatile polar liquid.

---

The present invention relates in general to apparatus for detecting and measuring radioactivity by liquid scintillation counting techniques, and more particularly concerns an apparatus and method for improving the accuracy of such counting.

Apparatus has heretofore been described for detecting and measuring radioactivity emanating from a radioactive substance dissolved or dispersed in a liquid scintillation medium. An excellent example of such apparatus, which is particularly suitable for the automatic analysis of a series of individual samples, is described and claimed in Robert E. Olson U.S. Patent 3,198,948, issued Aug. 3, 1965.

In practice, however, and with certain types of automatic sample conveying and transporting mechanisms, under conditions of extremely low atmospheric humidity the sample containers tend to accumulate substantial electrostatic charges. When the containers are subsequently placed within the scintillation counting device, the electrostatic charges are discharged in the form of a visible flash which presents a false light signal to the scintillation counters. This light is indistinguishable from the sample scintillations, and gives a false value for radioactivity of the sample. It is accordingly a primary object of the present invention to provide a method and means for removing electrostatic charges that may form on the sample containers before the containers are admitted into the scintillation counting device.

Another object is to provide such means in a convenient form, and which does not interfere with the normal operation of the liquid scintillation counting device. A further object is to provide a method and means for removing accumulated electrostatic charges from sample containers which are convenient to install, maintain, and replace.

A related problem that occurs with certain types of sample conveying or transferring mechanisms is that random dirt may collect on portions of a sample container that are in contact with horizontal surfaces of the conveying or transporting mechanism. This dirt is carried with the container into the scintillation counter where it may partially obscure the view of scintillation detectors. Although the effect of such dirt is relatively minor, it is nonetheless significant from the standpoint of interfering with the obtaining of accurate and reproducible scintillation counting. Another main object of the invention is to provide a means for removing such dirt from the sample containers.

Figure 1:
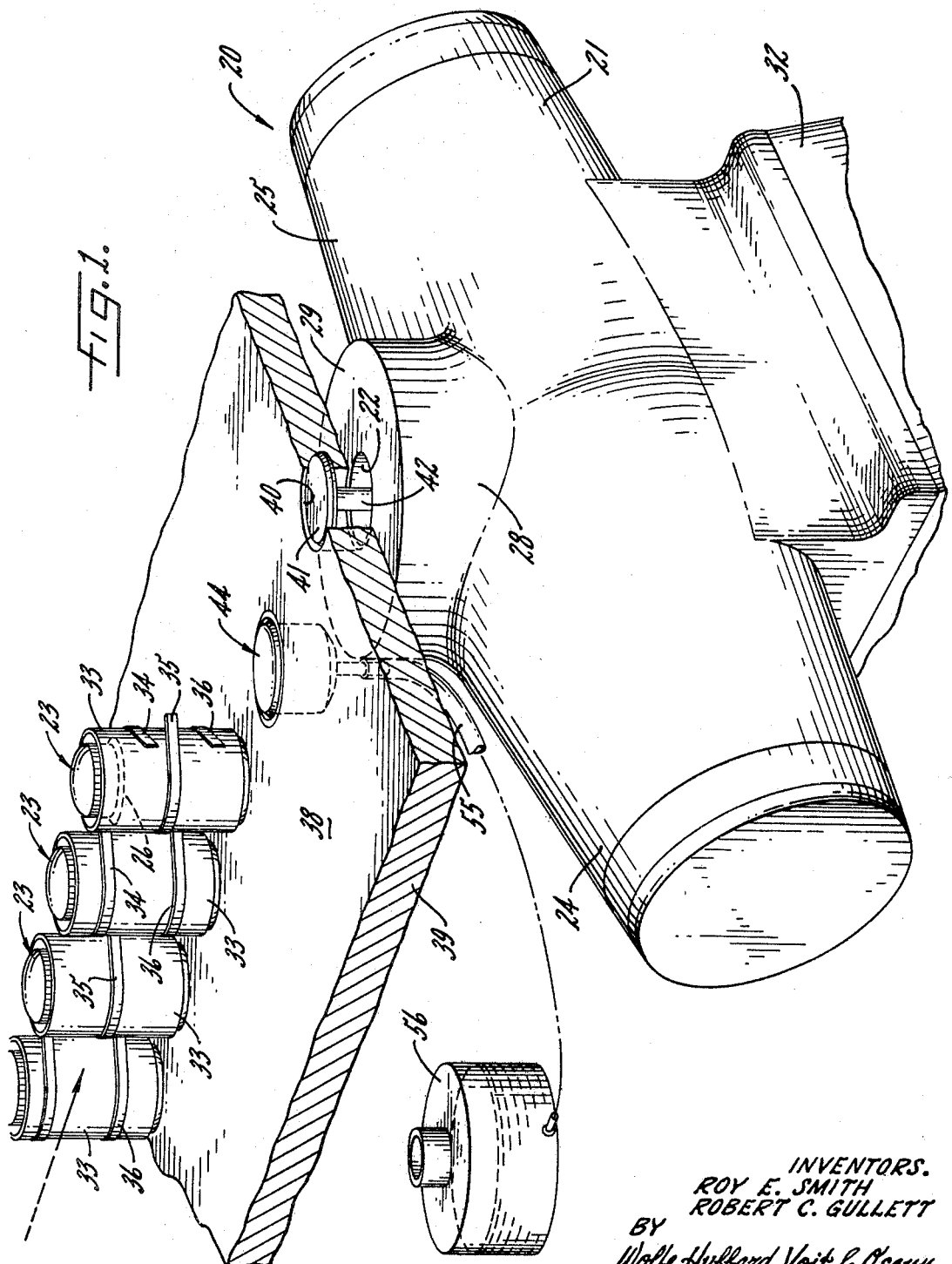
Figure 2:
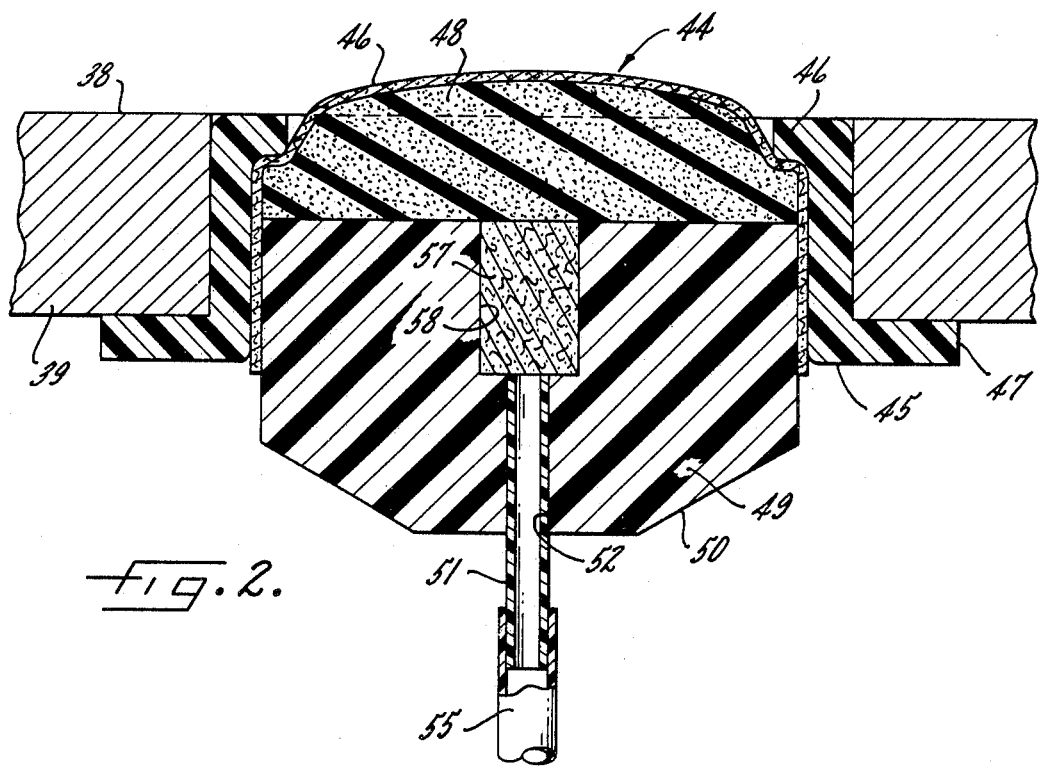

Other objects and advantages of the invention will become apparent as the following description proceeds, taken in conjunction with the accompanying drawings in which:

FIGURE 1 is an isometric view, taken partially in section, of the inventive means for removing electrostatic charges and dirt from a sample container while the container is being conveyed to a scintillation counter; and FIG. 2 is an enlarged vertical sectional view of a device according to the invention for removing electrostatic charges and adherent dirt from the bottom of sample containers.

While the invention is susceptible of various modifications and alternative forms, specific embodiments thereof have been shown by way of example in the drawings and will herein be described in detail. It should be understood, however, that it is not intended to limit the invention to the particular forms disclosed, but, on the contrary, the intention is to cover all modifications, equivalent and alternatives falling within the spirit and scope of the invention as expressed in the appended claim.

Referring now to the drawings, there is illustrated in FIG. 1 an exemplary radiation detecting and measuring apparatus, generally indicated at 20, which is suitable for measuring the radioactive energy levels of test samples in accordance with the features of the present invention. As the ensuing description proceeds, it will become apparent that the present invention will find particularly advantageous use with radiation detecting equipment of the type used in detecting and measuring the activity or energy level of a test sample wherein a radioactive source is disposed as a solution in a solvent containing or consisting of a liquid scintillator, the latter having the characteristic property of producing light flashes when subjected to ionizing radiation. Such detectors are commonly referred to as "liquid scintillation detectors." The present apparatus 20 is primarily intended to receive and process sample vials containing such a liquid scintillator and radioactive source.

For this purpose, the apparatus 20 includes an outer housing, or shield and base assembly 21, which defines a vertically disposed detection well 22 adapted to receive sample vials 23 one at a time in seriatim order. The shield and base assembly 21 is provided with a pair of laterally extending arms 24, 25 which serve to house proportional light transducers characterized by their ability to detect light scintillations in the sample vials and to convert such light scintillation into electrical signals, for example, voltage pulses which are proportional in amplitude to the light flash that causes the pulse. Such light transducers are well known in the art and need not be described in detail. (As shown in Olson U.S. 3,198,948, discussed above, such transducers may simply comprise a pair of photomultipliers which are mounted in oppositely disposed, coaxial, spaced relationship in the arms 24, 25 of the shield and base assembly 21. Thus, the photomultipliers are positioned on opposite sides of the detection well 22 so that sample vials 23 which are introduced into the well are mounted therebetween in light transmissive relationship therewith.)

The upper end of the shield and base assembly 21 comprises a generally cylindrical flange portion 28 having a planar upper surface 29 substantially coaxial with the detection well 22 and defining a cylindrical bore, viz. well 22, suitable for receiving a shutter mechanism (not shown) of the type described in the aforesaid Olson patent. The lower end of the shield and base assembly includes a generally box shaped housing or stand 32 suitable for housing control components used in conjunction with the apparatus 20. (These components are unnecessary to an understanding of the present invention, but further details thereof are shown in the aforesaid Olson patent.)

The general organization of the apparatus 20 is such that the sample vial 23 may be lowered into the cylindrical detection well 22 during a "count" cycle to a position where the light scintillations occurring in the sample are detected and measured by the photomultipliers. Since the latter are particularly sensitive to spectral radiation, provision is made in apparatus 20 for insuring that the photomultipliers are maintained in a light-tight housing at all times, so that the only light to which they are subjected is the scintillations occurring in the sample 26. It is for this reason that the upper end of the detection well 22 is closed by a shutter mechanism at all times other than when a sample is being loaded into the detection well 22 or ejected out of the detection well, and a light-obstructing shield is provided within the well 22 itself to operate when the top shutter is open (see the Olson patent).

While the particular means employed for delivering successive sample vials or containers 23 to the apparatus 20 is not critical to the present invention, the invention herein is particularly applicable to devices which automatically convey or transport sample vials 23 to the apparatus 20. Accordingly, relevant details of one such sample conveying or transporting device will be given herein, it being understood that this is exemplary of automatic devices for sequentially conveying sample containers to or into the radiation detecting and measuring apparatus 20. However, the present invention finds use with a wide range of different types of automatic, semiautomatic, and manual sample changers, sample elevator mechanisms, and the like, and is by no means exclusively limited to use with any particular type of sample changer.

Referring again to FIG. 1, the sample conveying mechanism therein exemplified is of the "endless belt" or "cartridge belt" type. In this conveying mechanism, a plurality of generally cylindrical cartridges 33, the tops of which are open to permit insertion of sample vials 23 and the bottoms of which are similarly open to permit withdrawal of vials 23, are inter-connected to form an endless belt or chain. Such interconnection is here effected by alternately passing a flexible textile ribbon 34 around one side of cartridge 33, the opposite side of the next succeeding cartridge, etc., inter-twining ribbon 35 in the opposite direction, and inter-twining ribbon 36 in the same direction and parallel to ribbon 34. Thus the successive cartridges are linked into an endless chain which can be advanced by sprocket gears, not shown, and thereby convey a series of sample vials 23 successively along a predetermined path and into registry with detection well 22.

The chain or belt composed of cartridges 33 with their contained sample vials 23 is positioned either slidably on top of surface 38 of table 39, or slightly above the surface 38. Table 39 is disposed in a horizontal plane, that is, in a plane perpendicular to detection well 22.

Table 39 is provided with a round sample container-transferring port 40 which is coaxial with detection well 22 in the radiation detecting and measuring apparatus 20. Bore 40 thus permits sample vials or containers 23 to be lowered below the level of table 38.

An elevator mechanism, including platform 41 and shaft 42 is disposed axially within detection well 22 and serves to lower or raise a sample container 23 from the level of surface 38 into scintillation counting proximity with radiation detecting and measuring apparatus 20. The manner in which such elevator mechanism operates in synchronization with light traps is described in the aforesaid Olson U.S. 3,198,948 patent.

As stated earlier, it has been found in practice that under conditions of low atmospheric humidity the sample containers 23, which are customarily made of glass or of an acrylic plastic, tend to accumulate electrostatic charges. Presumably this results from the sliding action of the bottom of containers 23 against an electrically insulating surface 38 of table 39; typically, table 39 is made of a melamine-formaldehyde thermosetting resin.

Containers 23 may also accumulate random dirt, either as a result of electrostatic attratcion or merely physical contact with dirt particles on surface 38.

The effect of electrostatic charges on container 23 is quite striking. When a container 23 is placed within the radiation detecting and measuring apparatus 20 to make a scintillation count, the electrostatic charge may discharge in the form of a multitude of visible flashes of light. Because the scintillation detectors are unable to discharge in the form of a multitude of visible flashes of light. Because the scintillation detectors are unable to discriminate between light from different sources, these flashes are recorded as radioactive disintegrations. These electrostatic discharge flashes can be so frequent that, on occasion, a false scintillation count at a rate of as high as 30,000 counts per minute will be recorded momentarily. By contrast, a typical background count (with a non-radioactive sample) is on the order of 20 or 25 counts per minute. It is apparent therefore that electrostatic discharge occurring within the scintillation counting zone of apparatus 20 is readily capable of confounding the scintillation counting procedure.

The effect of accumulated dirt is substantially less, but nonetheless it too can frustrate accurate or reproducible scintillation counting. Ideally, every scintillation occurring within sample container 23 will be observed directly by the photomultipliers in detecting and measuring apparatus 20 or, if not observed directly, then reflected from mirror-like surfaces in well 22—including the polished top of platform 41—until it is observed. However, should the surface of container 23 be covered in part by an opaque particle of dirt, a portion of the light may be absorbed by the dirt rather than reflected by the platform 41, and accordingly the scintillation count is reported at a lower value. In precision counting, where slight variations in activity are meaningful, an error of even a fractional percent can disturb the results of an experiment.

It has been discovered, according to the invention, that the effect of electrostatic charge and dirt deposition may be eliminated by a technique of removing both the charges and dirt from a container before the container is inserted into radiation detecting and measuring apparatus 20. This removal is accomplished, pursuant to the invention, by contacting the bottom of container 23, viz. that portion of container 23 which tends to accumultae electrostatic charges and dirt, with a volatile polar liquid before the container is placed in registry with port 40 of table 39 and detection well 22 of radiation detecting and measuring apparatus 20.

The polar liquid used in the apparatus described herein is advantageously either water, a lower alkanol (from 1 to 4 carbon atoms), or a mixture thereof. Methanol, ethanol, n-propanol, i-propanol, or the isomeric butanols are especially effective by reason of their high dipole moments, their volatility (to prevent undesirable liquid accumulation in apparatus 20), and their generally innocuous solvent properties on plastic components. Ordinarily, it is preferred that the polar liquid have a volatility at least as great as n-butanol (117.5° C. boiling point) and a dipole moment of at least about $1.0 \times 10^{-18}$ esu., or, in other words, at least about 1.0 Debye units. The polarity may however be lower where the effect of electrostatic charges is not likely to be severe, and, similarly, a less volatile liquid may be employed where contamination of apparatus 20 is unlikely.

In the preferred and illustrated form of the invention, sample containers 23 are contacted with the volatile polar liquid by wiping the bottom of container 23 with a foraminous resilient pad moistener with the volatile polar liquid. This pad 44 is disposed in the path of cartridges 33 while the containers 23 are being conveyed or slid along table 39 towards registry with part 40. As shown briefly in FIG. 1, pad 44 is connected via conduit 55 to a reservoir 56 of a volatile polar liquid, in this case aqueous isopropanol. Reservoir 56 may be placed above or below the level of surface 38 of table 39, but not so high above table 39 as to force an excessive amount of liquid through pad 44, and not too far below table 39 to prevent transfer of the liquid by capillary attraction. Alternatively, a low-volume pump may be incorporated in conduit 55 to pump the liquid.

Turning now to FIG. 2, showing an enlarged sectional plan view of the exemplary assembly constituting pad 44, it is seen that the pad assembly is contained in a housing 45 of generally cylindrical shape, flared inwardly at the top 46 and outwardly at the bottom 47. The bottom flare 47 is so dimensioned as to locate the top flare 46 at or below surface 38 of table 39 so as to avoid abutting contact with a sample container 23 or with a cartridge 33 (FIG. 1).

The pad itself is advantageously composed of two foraminous components, a foraminous resilient sheet 46, preferably of a leather or leather-like material, such as chamois skin, and a foraminous resilient pad 48 placed beneath sheet 46 in compressing relation therewith.

Plug 49, which seals the bottom of pad assembly 44, is a generally cylindrical member having a frusto-conical lower portion 50, and having an outer diameter somewhat less than the inner diameter of housing 45. Thus, when a disc of chamois skin is placed within housing 45, plug 49 will form a snug-fitting unitary assembly, retaining chamois sheet 46 in place. Housing 45 may conveniently be made of a thermoplastic material such as polyethylene, while plug 49 may either be die-cast from a similar thermoplastic or machined from a machinable resin such as Delrin acetal.

Plug 49 is forced upwardly into housing 45 by a sufficient amount to compress resilient pad 48, an originally-disc-shaped pad made of an open-celled flexible polyurethane foam, into compressing relationship with sheet 46. Pad 48 thus urges sheet 46 upward so that sheet 46 extends above the surface 38 of table 39. Thus, when a container 23 is slide over surface 38, the bottom of container 23 is wiped by the surface of sheet 46.

To maintain sheet 46 in a moistened condition, a fluid-communication conduit 51 is inserted into a corresponding hole 52 in plug 49, and is connected via a small diameter polyethylene or vinyl cannula tubing 55, that extends as a conduit to liquid reservoir 56 (FIG. 1).

The upper portion of conduit 51 extends to a cylindrical recess 56 bored in the upper portion of plug 49, and filled with a wad of rolled chamois skin 57 to establish a continuous fluid path between reservoir 56 (FIG. 1) and the upper portion of sheet 46. Otherwise stated, fluid from reservoir 56 (FIG. 1) travels through conduit 55 and conduit 51 as an unbroken stream, and moves through wad 57, at 48, and sheet 46 as a finely divided liquid passing through a foraminous material.

In experimental trials, it has been found that simple arrangement described above is completely effective for removing electrostatic charges and accumulated dirt from the bottom portions of sample containers. The system is simple and trouble free, yet solves an anotherwise serious problem.

Thus it is apparent that there has been provided, according to the invention, an effective means for removing electrostatic charges and deposited dirt from the bottom of sample containers used in liquid scintillation counting. By contacting or wiping the bottom portion of containers which have accumulated such charges or such dirt with a volatile polar liquid while the containers are being conveyed to a radiation detecting and measuring apparatus, electrostatic charges and dirt are thereby removed. Furthermore, the preferred arrangement does not impede either the conveying or the detecting-measuring functions of automatic liquid scintillation counting apparatus.

We claim as our invention:

1. In combination with a liquid scintillation counting apparatus for use with a liquid sample in a container, including means for detecting and measuring radioactivity in said sample, said detecting and measuring means being sensitive to electrostatic charges on said sample container, and means for conveying said sample to said detecting and measuring means, the improved combination therewith whereby electrostatic charges on said container are removed, comprising means for contacting the portion of said container accumulating electrostatic charges with a volatile polar liquid during said conveying but prior to transporting said sample into said detecting and measuring means.

2. Combination of claim 1 wherein said contacting means includes a resilient foraminous material continuously supplied with said liquid.

3. Combination of claim 1 wherein said liquid is water, a lower alkanol, or a mixture thereof.

4. Combination of claim 3 wherein said liquid is isopropanol.

5. Combination of claim 3 wherein said liquid is water.

6. Apparatus for liquid scintillation counting, comprising: a table having a port therein, means disposed beneath said port for detecting and measuring radioactivity, said detecting and measuring means being sensitive to electrostatic charges, means for sequentially conveying a plurality of sample containers along said table into registry with said port, means for lowering a sample container through said port into said detecting and measuring means, and a resilient member moistened with a volatile polar liquid, said member being carried by said table and disposed near said port in the path of said sample containers, for contacting the bottom of said containers before said containers are placed in registry with said port, whereby electrostatic charges and any dirt accumulating on the bottom of said containers are removed.

7. Apparatus of claim 6 wherein said volatile polar liquid is water, a lower alkanol, or a mixture thereof.

8. Means for contacting a container sliding over a surface member with a volatile polar liquid, comprising a generally cylindrical housing having an open-topped portion and carried by said surface member, a foraminous resilient sheet in said housing covering said open-topped portion, a bottom-sealing member for said housing, a resilient pad compressibly disposed between said sheet and said bottom-sealing member and urging said sheet above the level of said surface member, and conduit means for supplying said pad and said sheet with a volatile polar liquid.

9. In a liquid scintillation process, wherein a liquid sample in a container is conveyed to a scintillation detector and wherein said container tends to accumulate electrostatic charges during said conveying, the improvement whereby said electrostatic charges are removed which comprises contacting the portion of said container tending to accumulate such charges with a volatile polar liquid prior to detecting and measuring radioactivity in said sample.

10. Process of claim 9 wherein said volatile polar liquid is water, a lower alkanol, or a mixture thereof.

References Cited

UNITED STATES PATENTS

| 632,185 | 8/1899 | Jones | 317—2 |
|---|---|---|---|
| 1,163,656 | 12/1915 | Hadaway | 317—2 |
| 3,198,948 | 8/1965 | Olson. | |
| 3,283,151 | 11/1966 | Rowan et al. | |

RALPH G. NILSON, Primary Examiner

MORTON J. FROME, Assistant Examiner

U.S. Cl. X.R.:

250—71; 317—2